J. E. BOYLE.
Water-Meters.

No. 148,026. Patented March 3, 1874.

Witnesses:
Geo. Stevenson
G. L. Isham

Inventor:
J E Boyle

UNITED STATES PATENT OFFICE.

JAMES E. BOYLE, OF BROOKLYN, NEW YORK.

IMPROVEMENT IN WATER-METERS.

Specification forming part of Letters Patent No. 148,026, dated March 3, 1874; application filed January 7, 1874.

*To all whom it may concern:*

Be it known that I, JAMES E. BOYLE, of the city of Brooklyn, Kings county, New York, have invented certain new and useful Improvements in Water-Meters; and I do hereby declare that the following is a full and exact description thereof, reference being had to the accompanying drawing, making part of this application.

In the use of the ordinary screw or propeller machinery in water-meters, the accuracy of the measurement is impaired by the friction of the parts and the strain upon the bearings or centers.

My invention is intended to do away with friction, except that necessary to work the registering apparatus; and consists in using a conical-shaped float with spiral blades within the chamber of a water-meter, in which form the pressure of the water upon the float and its blades will operate to secure greater accuracy of measurement, and the float will adapt itself in the chamber of the meter to the amount of water demanded at the outlet, without impairing the accuracy of the measurement.

To enable those skilled in the art to make and use my invention, I will describe the construction and operation of my improved water-meter, referring by letters to the accompanying drawing.

Figure 1:
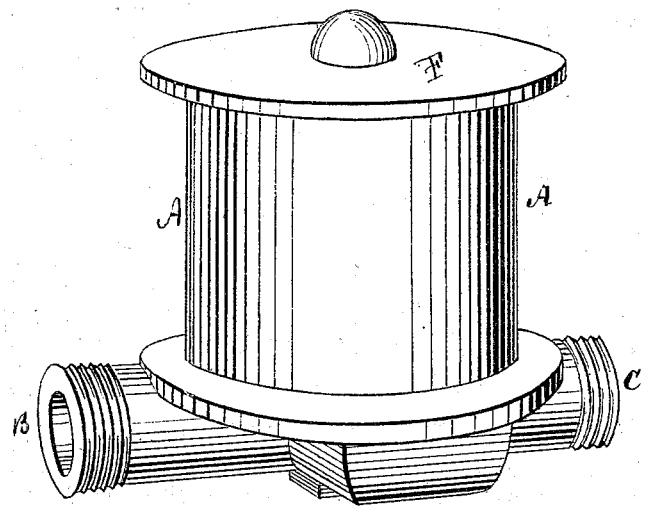
Figure 2:
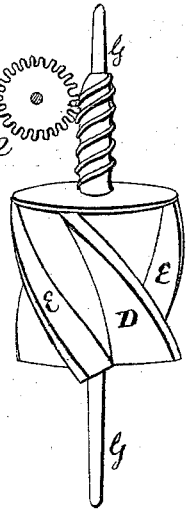
Figure 3:
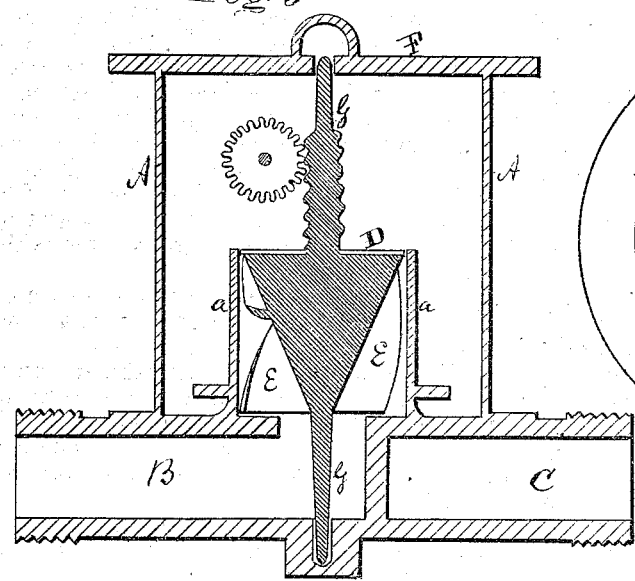
Figure 4:
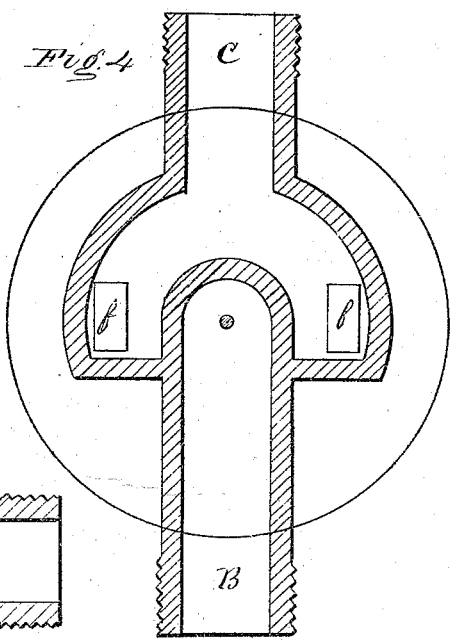

Figure 1 shows the outside case of the meter. Fig. 2 is a cone-shaped float or valve, with spiral blades. Fig. 3 is a vertical section of the several parts of the meter. Fig. 4 is a horizontal sectional view of the induction and eduction pipes of the meter.

In the several figures, the same part is designated by the same reference-letters.

A is the outside case of the meter. B is the induction-pipe, leading into the center of the chamber or cup $a\,a$. C is the eduction-pipe. $a\,a$ is an inside chamber or cup, open at the top. $f\,f$ are water-ways, or openings from the body of the water to the eduction-pipe. The whole may be of one casting, and of iron, brass, or other suitable material. D is a conical-shaped float or valve, with spiral blades, made of gutta-percha or other suitable material. The inverted conical float or valve extends down the chamber $a\,a$ to the opening of the induction-pipe B. E E are blades, fixed or cast upon the sides of the conical-shaped float or valve D, from top to bottom, but spirally around it. The blades E E extend to the sides of the chamber $a\,a$ in its full extent. F is the cap of the meter. G is a spindle, extending through the conical-shaped float or valve D, connecting with the usual registering apparatus.

It will be seen that when the meter is at rest, the conical-shaped float or valve D will sink in chamber $a\,a$ until the lower end of the spindle G rests at the bottom of the socket H. When water is being drawn at the eduction-pipe C, the force or pressure of the water through the opening in the bottom of the chamber $a\,a$ upon the conical-shaped float or valve D and its spiral blades E E raises the float or valve D against the pressure of the body of water above it, to admit of the passage of sufficient water over the edge of the chamber $a\,a$ to supply the demand made at the outlet, and at the same time gives to the valve D a whirling motion within the chamber $a\,a$. The valve D being connected with the register by means of the spindle G, its motion works the registering apparatus.

Having fully described my improved water-meter, what I claim as my invention, and desire to secure by Letters Patent, is—

1. The chamber $a\,a$ of a water-meter, within its outside case A A, with the inlet B at the center of the bottom of the chamber $a\,a$, and the outlet C at the bottom of the chamber, formed by the outside case A A through the openings $f\,f$, substantially as described.

2. The float D, of conical shape or form, with spiral blades E E, in combination with the casings of a water-meter, substantially as described.

J. E. BOYLE.

Witnesses:
GEO. STEVENSON,
G. L. ISHAN.